United States Patent
Schwantje

[11] 3,867,406
[45] Feb. 18, 1975

[54] ANTHRAQUINOID DISPERSE DYES

[75] Inventor: Gerd Schwantje, Ludwigshafen, Germany

[73] Assignee: Badische Anilin- & Soda-Fabrik Aktiengesellschaft, Ludwigshafen, Germany

[22] Filed: June 4, 1973

[21] Appl. No.: 366,498

[30] Foreign Application Priority Data
June 6, 1972 Germany............................ 2227401

[52] U.S. Cl............................................ 260/326 D
[51] Int. Cl. ...................... C07d 27/00, C07d 27/52
[58] Field of Search................................ 260/326 D

[56] References Cited
UNITED STATES PATENTS
3,316,280  4/1967  Vollmann et al. .................. 260/381
3,483,217  12/1969  Santimauro et al................. 260/326

FOREIGN PATENTS OR APPLICATIONS
1,429,358  1/1966  France............................ 260/326 D Primary Examiner—Elbert L. Roberts
Attorney, Agent, or Firm—Johnston, Keil, Thompson & Shurtleff

[57] ABSTRACT

A disperse dye of the formula (I):

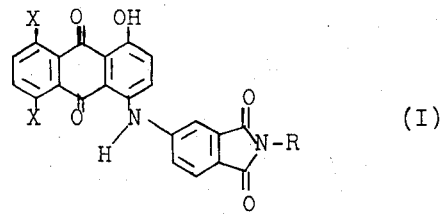

in which
one X is OH and the other X is $NH_2$; and
R is hydrogen, cycloalkyl, phenyl or alkyl which may bear hydroxyl or alkoxy as a substitutent. It dyes linear polyesters deep bluish green hues of outstanding fastness properties.

16 Claims, No Drawings

ANTHRAQUINOID DISPERSE DYES

The present invention relates to new bluish green anthraquinoid disperse dyes of the formula (I):

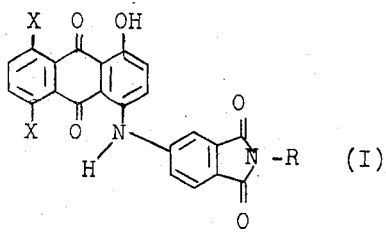

in which
one X is hydroxyl;
the other X is amino; and
R is hydrogen, linear or branched alkyl of one to eight carbon atoms, hydroxyalkyl of two to six carbon atoms, alkoxyalkyl of a total of three to six carbon atoms, β-carbalkoxyethyl of a total of four to seven carbon atoms, cycloalkyl of five to eight carbon atoms or phenyl.

The new dyes and mixtures of the same dye synthetic fibrous material of linear aromatic polyesters full bluish green hues by the usual methods from an aqueous liquor. The dyeings obtained have outstanding fastness to light, washing, perspiration and dry-heat pleating and setting.

Examples of linear and branched alkyl for R are: methyl, ethyl, n-propyl, isopropyl, n-butyl, isobutyl, 2-butyl, n-pentyl, isopentyl, n-hexyl, isohexyl and β-ethylhexyl and examples of hydroxyalkyl of two to six carbon atoms are: β-hydroxyethyl, β-hydroxyethoxyethyl, γ-hydroxypropyl, ε-hydroxypentyl and β,β-dimethyl-γ-hydroxypropyl.

Examples of alkoxyalkyl of a total of two to six carbon atoms for R are: β-methoxyethyl, β-ethoxyethyl, γ-methoxypropyl, γ-ethoxypropyl and γ-(isopropyloxy)-propyl and examples of β-carbalkoxyethyl of a total of four to seven carbon atoms are: β-carbomethoxyethyl, β-carboethoxyethyl, β-carbopropoxyethyl, β-carbobutoxyethyl and β-(carbo-β'-hydroxyethoxy)-ethyl.

Dyes of the formula (I) in which R is linear or branched alkyl of two to six carbon atoms or hydroxyalkyl of two to six carbon atoms are preferred because of their good affinity. Dyes of the formula (I) in which R is n-propyl, n-butyl, n-hexyl, 2-ethylhexyl, β-hydroxyethyl or β-(β'-hydroxyethoxy)-ethyl are particularly preferred.

The novel dyes of the invention are conveniently obtained from 1,5-dinitro-4,8-dihydroxyanthraquinone, 1,8-dinitro-4,5-dihydroxyanthraquinone or mixtures of the same by heating in the presence of at least a stoichiometric amount of a 4-aminophthalimide of the formula (II):

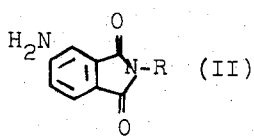

in which R has the meanings given above in a high boiling organic solvent or diluent followed by reduction of the nitro groups contained in the reaction product by a conventional method under conditions under which hydrolysis of the phthalimide group does not take place.

The 1,5-dinitro-4,8-dihydroxyanthraquinone or 1,8-dinitro-4,5-dihydroxyanthraquinone or mixture of the same used as starting compound is obtained by a conventional method by nitration of the appropriate 1,5-/1,8-diphenoxyanthraquinone, for example by the method described in BIOS, 1493, 8.

Examples of 4-aminophthalimides having a substituent on the imide nitrogen and of the formula (II) are:

4-amino-N-methylphthalimide,
4-amino-N-ethylphthalimide,
4-amino-N-(n-propyl)-phthalimide,
4-amino-N-isopropylphthalimide,
4-amino-N-(n-butyl)-phthalimide,
4-amino-N-isobutylphthalimide,
4-amino-N-(2-butyl)-phthalimide,
4-amino-N-(n-pentyl)-phthalimide,
4-amino-N--isopentylphthalimide,
4-amino-N-(n-hexyl)-phthalimide,
4-amino-N-isohexylphthalimide,
4-amino-N-(β-ethylhexyl)-phthalimide,
4-amino-N-(β-hydroxyethyl)-phthalimide,
4-amino-N-(γ-hydroxypropyl)-phthalimide,
4-amino-N-(β-hydroxyethoxyethyl)-phthalimide,
4-amino-N-(ε-hydroxypentyl)-phthalimide,
4-amino-N-(β,β-dimethyl-γ-hydroxypropyl)-phthalimide,
4-amino-N-(β-methoxyethyl)-phthalimide,
4-amino-N-(β-ethoxyethyl)-phthalimide,
4-amino-N-(γ-methoxypropyl)-phthalimide,
4-amino-N-(γ-ethoxypropyl)-phthalimide,
4-amino-N-(γ-isopropyloxypropyl)-phthalimide,
4-amino-N-(β-carbomethoxyethyl)-phthalimide,
4-amino-N-(β-carboethoxyethyl)-phthalimide,
4-amino-N-(β-carbobutoxyethyl)-phthalimide,
4-amino-N-[β-(carbo-β'-hydroxyethoxy)-ethyl]-phthalimide,
4-amino-N-cyclohexylphthalimide and
4-amino-N-phenylphthalimide.

Reaction of the dinitrodihydroxyanthraquinone with the 4-aminophthalimide is conveniently carried out in a high boiling solvent such as trichlorobenzene, napthalene or 2-methylnaphthalene, preferably in nitrobenzene, diphenyl or diphenyl ether at a temperature of from 180° to 250°C, preferably from 190° to 220°C. At least a stoichiometric amount of 4-aminophthalimide of the formula (II) is used for reaction with the dinitrodihydroxyanthraquinone. It is preferable however to use an excess of 4-aminophthalimide (II). From 10 to 2 moles, preferably from 3.5 to 2 moles, of the aminophthalimide is generally used, based on 1 mole of dinitrodihydroxyanthraquinone. Even when a large molar excess of aminophthalimide is used only one nitro group in the dinitroanthraquinone is as a rule replaced by the aminophthalimide radical.

The reaction product is isolated from the reaction mixture by a conventional method, for example by filtration. The filter cake may be freed from the solvent used in the reaction either by washing with a solvent which is miscible with water or by steam distillation and may then be dried if desired. In cases where the solvent or diluent is solid at a temperature of about 50°C the reaction mixture is advantageously diluted with an inert diluent which does not dissolve the reaction product such as methanol, ethanol, acetone, benzene or toluene and then the reaction product is isolated by a conventional method Reduction of the nitro groups contained in the reaction product is carried out under conditions under which hydrolysis of the imide groups does not take place. The reducing agent generally used is an alkali metal hydrogen sulfide, alkali metal sulfide or alkali metal polysulfide, preferably ammonium hydrogen sulfide, ammonium sulfide or ammonium polysulfide or a mixture of the same in the form of an aqueous solution thereof. The reduction may conveniently be carried out in a mixture of ethanol and/or methanol and aqueous ammonia solution or in a mixture of N-methylpyrrolidone or N,N-dimethylformamide and water at a temperature of from room temperature to 100°C. Reduction may also be carried out in water alone. The reducing agent is used in at least the stoichiometric amount. To accelerate reduction it is convenient to use for the the reduction from 2 to 5, preferably from 2.5 to 3.5, moles of the sulfide per mole of the reaction product.

The dye is separated from the reduction mixture by a conventional method, for example by filtration, centrifuging or decantation and the residue is washed thoroughly and if necessary dried.

The novel dyes of the invention have much higher light fastness properties and clearly higher fastness to dry-heat pleating and setting than the dyes disclosed in German Pat. No. 1,287,235 which bear a group of the formula:

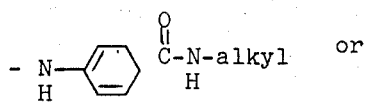

or

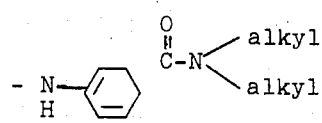

in the α-position of the anthraquinone nucleus.

The following Examples illustrate the invention. Parts and percentages hereinafter referred to are by weight.

EXAMPLE 1

49.5 parts of 1,5-dihydroxy-4,8-dinitroanthraquinone and 61.2 parts of 4-amino-N-propylphthalimide are heated at 205° to 210°C for twenty-two hours in 600 parts of nitrobenzene. The cooled mixture is poured into 1,500 parts of methanol and the precipitate is suction filtered and washed with methanol. The yield is 52.0 parts of a dye of the constitution:

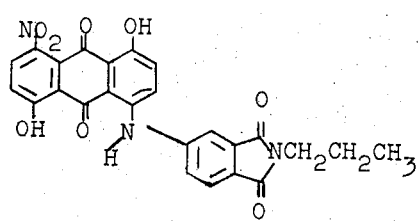

EXAMPLE 2

33 parts of a mixture of about equal parts of 1,5-dihydroxy-4,8-dinitroanthraquinone and 1,8-dihydroxy-4,5-dinitroanthraquinone and 49.2 parts of 4-amino-N-(n-hexyl)-phthalimide in 350 parts of diphenyl ether are kept for twenty hours at boiling temperature. The whole is cooled to 50°C and poured into 1,000 parts of methanol and the precipitate is suction filtered. The residue is boiled up with 1,000 parts of methanol, cooled to room temperature, suction filtered and dried. The yield is 40.2 parts of a dye consisting of a mixture of the compounds:

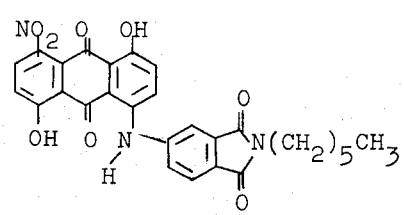

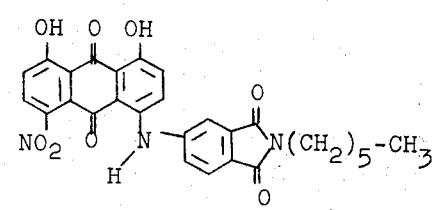

Mixtures containing about equal amounts of the dyes of the formulae:

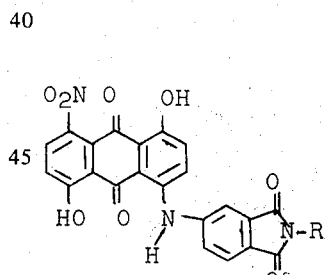

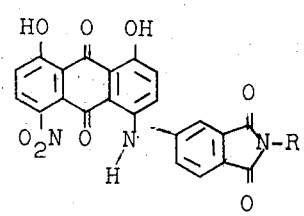

in which R has the meanings given in the following Table are prepared as described in Example 1 or 2 from a mixture of about equal parts of 1,5-dihydroxy-4,8-dinitroanthraquinone and 1,8-dihydroxy-4,5-dinitroanthraquinone by reaction with a 4-aminophthalimide of the formula (II)

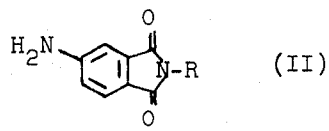

(II)

| Example | R | Yield in % of theory |
|---|---|---|
| 3 | -CH$_2$-CH(C$_2$H$_5$)-(CH$_2$)$_3$-CH$_3$ | 83 |
| 4 | -CH$_2$-CH$_2$-OH | 91 |
| 5 | -CH$_2$-CH$_2$-O-CH$_2$-CH$_2$-OH | 89 |
| 6 | -CH$_2$-CH$_2$-OCH$_3$ | 93 |
| 7 | -CH$_2$-CH$_2$-CH$_2$-OC$_2$H$_5$ | 87 |
| 8 | -CH$_2$-CH$_2$-C(O)-O-CH$_2$-CH$_3$ | 87 |
| 9 | -C$_6$H$_{11}$ (cyclohexyl) | 91 |
| 10 | -C$_6$H$_5$ (phenyl) | 78 |
| 11 *) | H | 84 |
| 12 | -CH$_3$ | 93.5 |
| 13 | -CH$_2$CH$_2$CH$_2$CH$_2$CH$_2$OH | 86.9 |
| 14 | -CH$_2$CH$_2$CH$_2$OCH(CH$_3$)$_2$ | 81.8 |
| 15 | -CH$_2$CH$_2$CO$_2$CH$_2$CH$_2$CH$_2$CH$_3$ | 79.6 |

*) 1,8-dihydroxy-4,5-dinitroanthraquinone is used.

EXAMPLE 16

A mixture of 19.5 parts of the dye obtained in Example 1, 150 parts of ethanol, 50 parts of 20 percent ammonium sulfide solution and 50 parts of 24 percent aqueous ammonia solution is stirred for three hours at room temperature. The mixture is then poured into water, and the precipitate is suction filtered and washed with ethanol and water. The yield is 18.0 parts of a dye of the constitution:

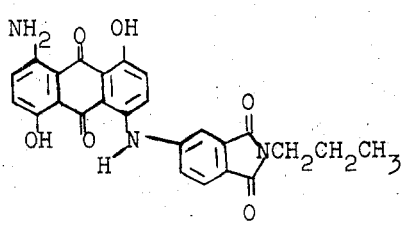

It dyes polyester greenish blue hues of outstanding fastness properties.

EXAMPLE 17

15.9 parts of the dye mixture obtained in Example 2, 120 parts of methanol, 37.5 parts of 25 percent aqueous ammonia solution and 35 parts of 20 percent ammonium sulfide solution are stirred for three hours at room temperature. The whole is then suction filtered and the residue is washed with methanol and water and dried.

The yield is 13.7 parts of a dye consisting of a mixture of the compounds:

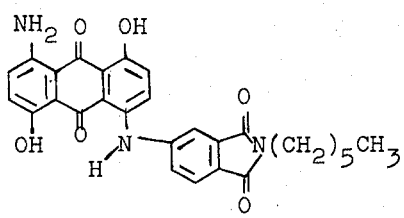

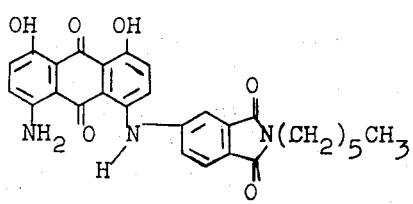

It dyes polyesters bluish green hues of outstanding fastness properties.

EXAMPLE 18

16.7 parts of the mixture prepared in Example 3 is suspended in 500 parts of water. Then 50 parts of N-emthylpyrrolidone, 50 parts of 10 percent aqueous ammonia solution and 40 parts of 40 percent ammonium sulfide sulution are added and the whole is kept at 90° to 95°C for one hour, suction filtered while hot and washed with hot water. 15.0 parts of a dye is obtained which contains the compounds:

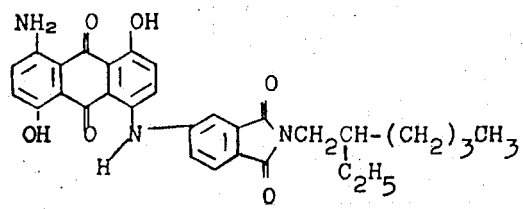

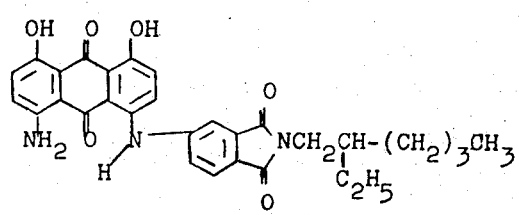

and dyes polyesters bluish green hues of outstanding fastness properties.

EXAMPLE 19

19.4 parts of the mixture from Example 4 is reduced as described in Example 16. The yield is 17.7 parts of a mixture containing the compounds of the formulae:

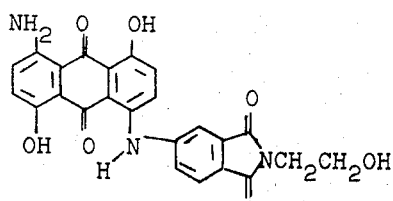

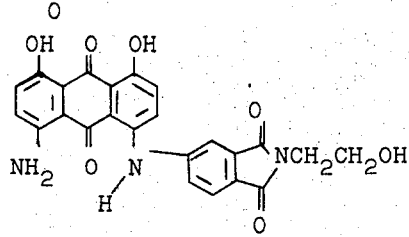

It dyes polyesters bluish green hues having outstanding fastness properties.

EXAMPLE 20

16.0 parts of the mixture prepared according to Example 5 is reduced as described in Example 16. 14.1 parts of a mixture is obtained which contains the compounds:

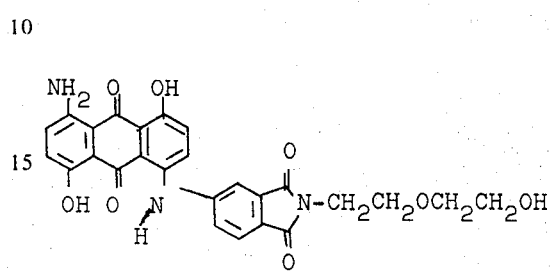

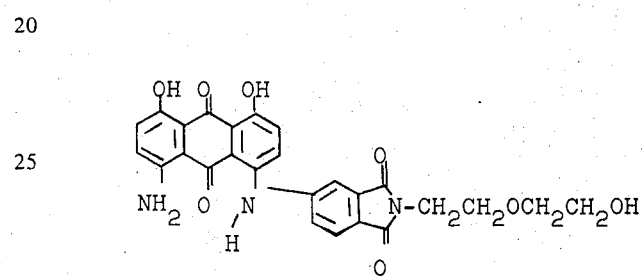

and dyes polyesters bluish green hues having outstanding fastness properties.

EXAMPLE 21

20.0 parts of the mixture obtained in Example 6 is reduced as described in Example 16. The yield is 16.8 parts of a mixture which contains the compounds:

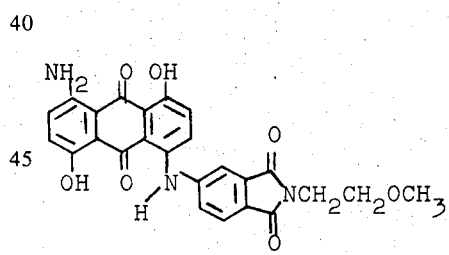

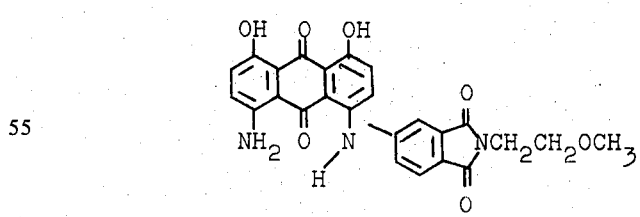

and dyes polyesters bluish green hues having outstanding fastness properties.

EXAMPLE 22

17.4 parts of the mixture obtained according to Example 7 is reduced as described in Example 16. The yield is 15.7 parts of a mixture which contains the compounds:

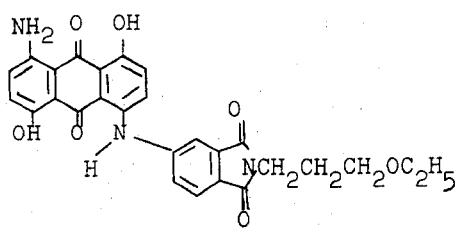

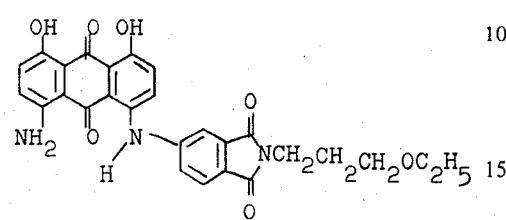

and dyes polyesters bluish green hues having outstanding fastness properties.

EXAMPLE 23

16.8 parts of the mixture obtained in Example 8 is reduced as described in Example 16. The yield is 14.4. parts of mixture which contains the compounds:

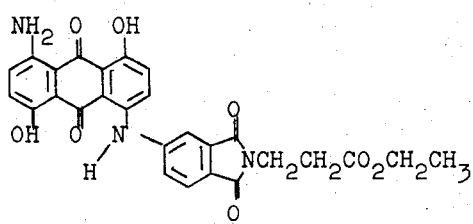

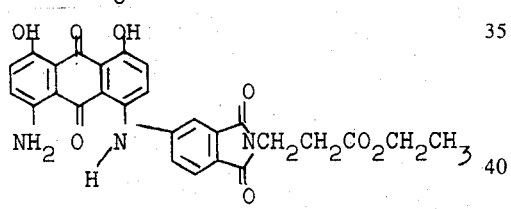

and dyes polyesters bluish green hues having outstanding fastness properties.

EXAMPLE 24

15.8 parts of the mixture obtained according to Example 9 is reduced as described in Example 16. The yield is 14.4 parts of a mixture which contains the compounds:

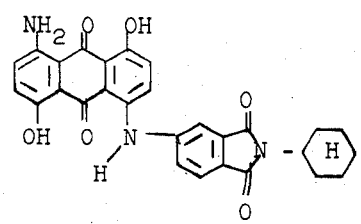

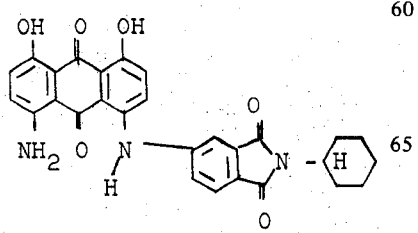

and which dyes polyesters bluish green hues having outstanding fastness properties.

EXAMPLE 25

15.7 parts of the mixture obtained in Example 10 is reduced as described in Example 16. The yield is 13.4 parts of a mixture which contains the compounds:

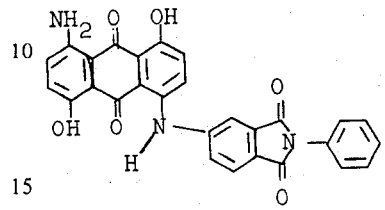

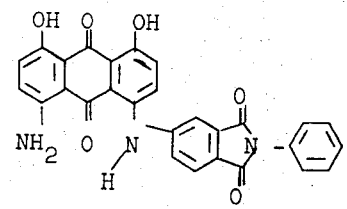

and which dyes polyester bluish green hues of outstanding fastness properties.

EXAMPLE 26

17.8 parts of the compound prepared according to Example 11 is reduced as described in Example 16. The yield is 15.3 parts of the dye of the formula:

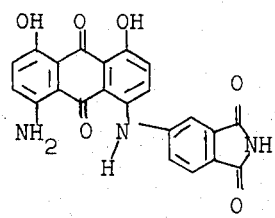

which dyes polyesters bluish green hues of outstanding fastness properties.

EXAMPLE 27

13.8 parts of the mixture from Example 12 is reduced as described in Example 16. 12.3 parts of a mixture is obtained which contains the compounds:

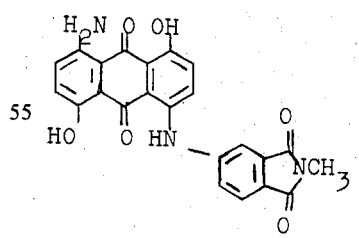

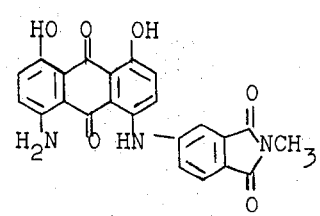

and dyes polyesters bluish green hues having outstanding fastness properties.

EXAMPLE 28

16.0 parts of the mixture from Example 13 is reduced as in Example 16. 14.1 parts of a mixture is obtained which contains the compounds:

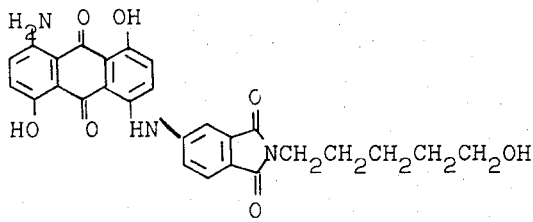

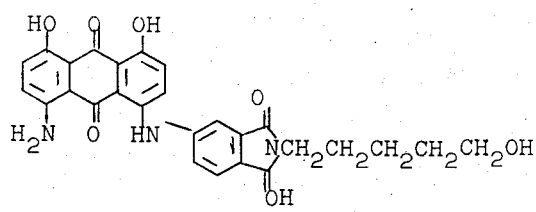

and dyes polyesters bluish green hues having outstanding fastness properties.

EXAMPLE 29

16.4 parts of a mixture from Example 14 is reduced as described in Example 16. 14.9 parts of a mixture is obtained which contains the compounds:

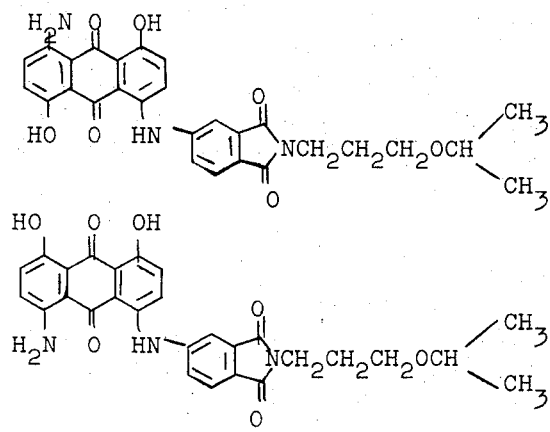

and which dyes polyesters bluish green hues having outstanding fastness properties.

EXAMPLE 30

17.2 parts of a mixture from Example 15 is reduced as described in Example 16. 14.8 parts of a dye mixture is obtained which contains the compounds:

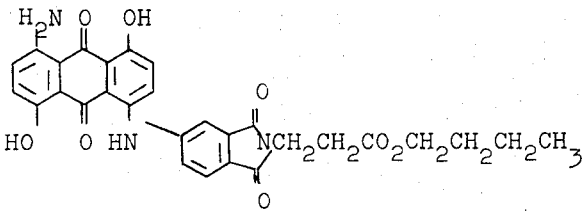

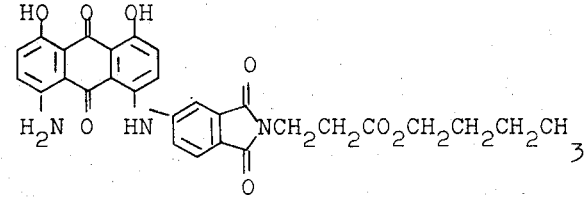

and which dyes polyesters bluish green hues having outstanding fastness properties:

I claim:

1. An anthraquinoid dye of the formula:

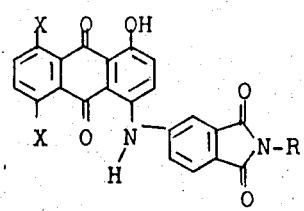

in which
one X is hydroxyl;
the other X is amino; and
R is hydrogen, linear or branched alkyl of one to eight carbon atoms, hydroxyalkyl of two to six carbon atoms, alkoxyalkyl of a total of three to six carbon atoms, $\beta$-carbalkoxyethyl of a total of four to seven carbon atoms, $\beta$-($\beta'$-hydroxyethoxy)-ethyl, $\beta$-(carbo-$\beta'$-hydroxyethoxy)-ethyl, cyclohexyl, or phenyl.

2. A disperse dye of the formula according to claim 1 in which R is linear or branched alkyl of two to six carbon atoms or hydroxyalkyl of two to six carbon atoms.

3. A disperse dye of the formula according to claim 1 in which R is n-propyl, n-butyl, n-hexyl, 2-ethylhexyl, $\beta$-hydroxyethyl or $\beta$-($\beta'$-hydroxyethoxy)-ethyl.

4. A disperse dye according to the formula of claim 1 wherein R is hydrogen.

5. A disperse dye according to the formula of claim 1 wherein R is linear or branched alkyl of one to eight carbon atoms.

6. A disperse dye according to the formula of claim 1 wherein R is alkoxyalkyl of a total of three to six carbon atoms.

7. A disperse dye according to the formula of claim 1 wherein R is $\beta$-carbalkoxyethyl of a total of four to seven carbon atoms.

8. A disperse dye according to the formula of claim 1 wherein R is $\beta$-($\beta'$-hydroxyethoxy)-ethyl.

9. A disperse dye according to the formula of claim 1 wherein R is $\beta$-(carbo-$\beta$-hydroxyethoxy)-ethyl.

10. A disperse dye according to the formula of claim 1 wherein R is cyclohexyl.

11. A disperse dye according to the formula of claim 1 wherein R is phenyl.
12. The dye of the formula:
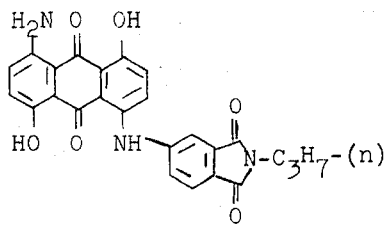
13. The dye of the formula:
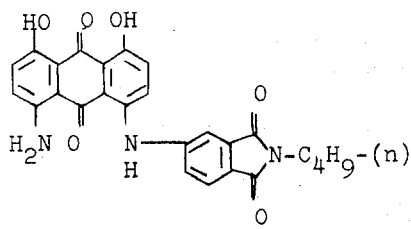
14. The dye of the formula:
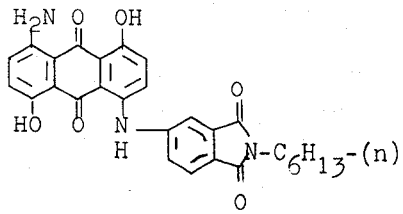
15. The dye of the formula:
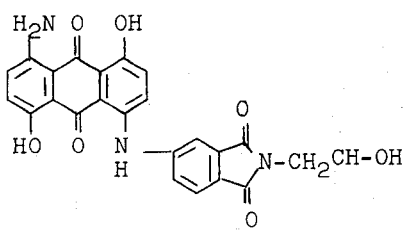
16. The dye of the formula:
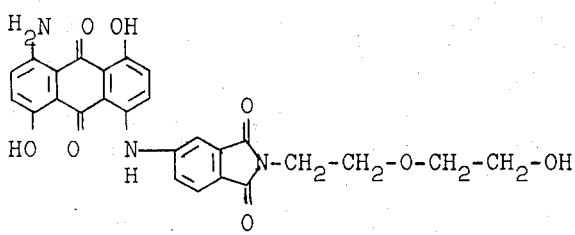
* * * * *